United States Patent
Nejedly et al.

(10) Patent No.: US 12,142,989 B2
(45) Date of Patent: Nov. 12, 2024

(54) ELECTRICAL CONNECTOR ARRANGEMENT FOR ELECTRONIC COMPONENT OF TURBOMACHINE

(71) Applicant: Garrett Transportation I Inc, Torrance, CA (US)

(72) Inventors: Milan Nejedly, Brno (CZ); Petr Koplik, Brno (CZ); Vit Houst, Sestajovice (CZ)

(73) Assignee: GARRETT TRANSPORTATION I INC, Torrance, CA (US)

( * ) Notice: Subject to any disclaimer, the term of this patent is extended or adjusted under 35 U.S.C. 154(b) by 316 days.

(21) Appl. No.: 17/661,062

(22) Filed: Apr. 28, 2022

(65) Prior Publication Data

US 2023/0353009 A1    Nov. 2, 2023

(51) Int. Cl.

| H01R 9/16 | (2006.01) |
| H02C 7/28 | (2006.01) |
| F02C 7/36 | (2006.01) |
| H01R 9/22 | (2006.01) |
| H01R 9/24 | (2006.01) |
| H01R 13/52 | (2006.01) |
| H02K 5/22 | (2006.01) |
| H02K 11/33 | (2016.01) |
| H02K 15/00 | (2006.01) |

(52) U.S. Cl.
CPC ........... *H02K 5/225* (2013.01); *F02C 7/28* (2013.01); *F02C 7/36* (2013.01); *H01R 9/16* (2013.01); *H01R 9/22* (2013.01); *H01R 9/24* (2013.01); *H01R 13/5202* (2013.01); *H01R 13/521* (2013.01); *H01R 13/5219* (2013.01); *H02K 11/33* (2016.01); *H02K 15/0062* (2013.01); *F05D 2240/11* (2013.01)

(58) Field of Classification Search
None
See application file for complete search history.

(56) References Cited

U.S. PATENT DOCUMENTS

| 8,454,329 B2 * | 6/2013 | Taguchi | H02G 3/22 310/71 |
| 2017/0279339 A1 * | 9/2017 | Kinoshita | F25B 31/026 |
| 2021/0296796 A1 | 9/2021 | Molinero et al. | |

FOREIGN PATENT DOCUMENTS

| FR | 2973604 A1 | 10/2012 |
| FR | 2997797 A1 | 5/2014 |

* cited by examiner

Primary Examiner — Tho D Ta
(74) Attorney, Agent, or Firm — LORENZ & KOPF, LLP

(57) ABSTRACT

An electrical connector arrangement for a turbomachine includes a support structure and a terminal with a terminal post projecting from the support structure along an axis. The electrical connector arrangement includes a connection stack that is supported by the terminal and arranged along the axis of the terminal post. The connection stack includes a bus bar that is electrically connected to the terminal post and that extends from the terminal post and the support structure. The connection stack includes a first deformable seal member and a second deformable seal member. The first deformable seal member is deformed against the terminal post to define an inner radial seal within the connection stack. The second deformable seal member is deformed against the support structure to define an outer radial seal within the connection stack.

20 Claims, 7 Drawing Sheets

ELECTRICAL CONNECTOR ARRANGEMENT FOR ELECTRONIC COMPONENT OF TURBOMACHINE

TECHNICAL FIELD

The present disclosure generally relates to an electrical connector arrangement and, more particularly, relates to an electrical connector arrangement for an electronic component of a turbomachine.

BACKGROUND

Various electrical devices are proposed that include different types of electrical connector arrangements. The electrical connector arrangements may include terminals and electrical lines that provide electrical connection between the electrical device and an external component (e.g., a power source, etc.). Some turbomachines, for example, may include an electrical device with an electrical connector for an internal electrical device. Fluid compressor devices, turbochargers, and/or other turbomachines may be configured with an electric motor, generator, etc. and may include an electrical connector arrangement for electrically connecting the internal electrical device to a power source or other external component.

However, some electrical connector arrangements may not provide robust connection and/or may degrade over time. For example, some electrical connector arrangements may not be sufficiently moisture resistant, and water may intrude through the connector arrangement. Furthermore, some electrical connection arrangements may be inconvenient during assembly, disassembly, or during replacement. For example, conventional electrical connector arrangements may be inconvenient for use of a turbomachine within a larger system. The electrical arrangement may be time consuming during assembly, disassembly, replacement, etc. It may be difficult to measure when sufficient attachment forces have been applied to ensure proper attachment. Conventional electrical arrangements may have a high part count and/or may increase manufacturing inefficiencies and costs as well.

Accordingly, it is desirable to provide an improved electrical connector arrangement, such as an electrical connector arrangement for a turbomachine. It is desirable to provide an electrical connector arrangement that provides robust and reliable support, that ensures electrical connection, and that inhibits moisture intrusion into the electrical components. It is further desirable to provide an electrical connector arrangement that increases manufacturing efficiency, that facilitates installation, assembly, disassembly, and/or replacement of the electrical device, turbomachine, etc. Other desirable features and characteristics of the present disclosure will become apparent from the subsequent detailed description and the appended claims, taken in conjunction with the accompanying drawings and this background discussion.

BRIEF SUMMARY

In one embodiment, an electrical connector arrangement for a turbomachine is disclosed that includes a support structure and a terminal with a terminal post projecting from the support structure along an axis. The electrical connector arrangement includes a connection stack that is supported by the terminal and arranged along the axis of the terminal post. The connection stack includes a bus bar that is electrically connected to the terminal post and that extends from the terminal post and the support structure. The connection stack includes a first deformable seal member and a second deformable seal member. The first deformable seal member is deformed against the terminal post to define an inner radial seal within the connection stack. The second deformable seal member is deformed against the support structure to define an outer radial seal within the connection stack.

In another embodiment, a method of manufacturing an electrical connector arrangement for a turbomachine is disclosed. The method includes providing a support structure and a terminal with a terminal post projecting from the support structure along an axis. The method also includes supporting a connection stack on the terminal and along the axis of the terminal post. The connection stack includes a bus bar that is electrically connected to the terminal post and that extends from the terminal post and the support structure. The method further includes deforming a first deformable seal member and a second deformable seal member of the connection stack, including deforming the first deformable seal member against the terminal post to define an inner radial seal within the connection stack, and deforming the second deformable seal member against the support structure to define an outer radial seal within the connection stack.

Moreover, in another embodiment, a fluid compressor device is disclosed that includes an electric motor. The fluid compressor device also includes an outer housing that houses the electric motor. The fluid compressor device further includes an electrical connector arrangement supported on the outer housing. The electrical connector arrangement includes a support structure attached to the outer housing. The electrical connector arrangement further includes a terminal with a terminal post projecting from the support structure along an axis. The electrical connector arrangement also includes a connection stack that is supported by the terminal and arranged along the axis of the terminal post. The connection stack includes a bus bar that is electrically connected to the terminal post and that extends through the outer housing from the terminal post and the support structure. Moreover, the connection stack includes a first deformable seal member and a second deformable seal member. The first deformable seal member is deformed against the terminal post to define an inner radial seal within the connection stack. The second deformable seal member is deformed against the support structure to define an outer radial seal within the connection stack.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved electrical connector arrangement, for example, for a turbomachine. The electrical connector arrangement may include features for conveniently and effectively attaching an electrical machine, such as a motor, to an external component, such as a power source. The electrical connector arrangement may provide robust mechanical support while ensuring electrical connection for an extended operating lifetime and in a wide variety of operating conditions. The electrical connector arrangement may be moisture-resistant and may limit passage of moisture therethrough. Accordingly, the structural and electrical connections provided by the electrical connector arrangement may be highly robust and reliable. Also, the electrical connector arrangement may also provide various manufacturing advantages and efficiencies.

Figure 1:
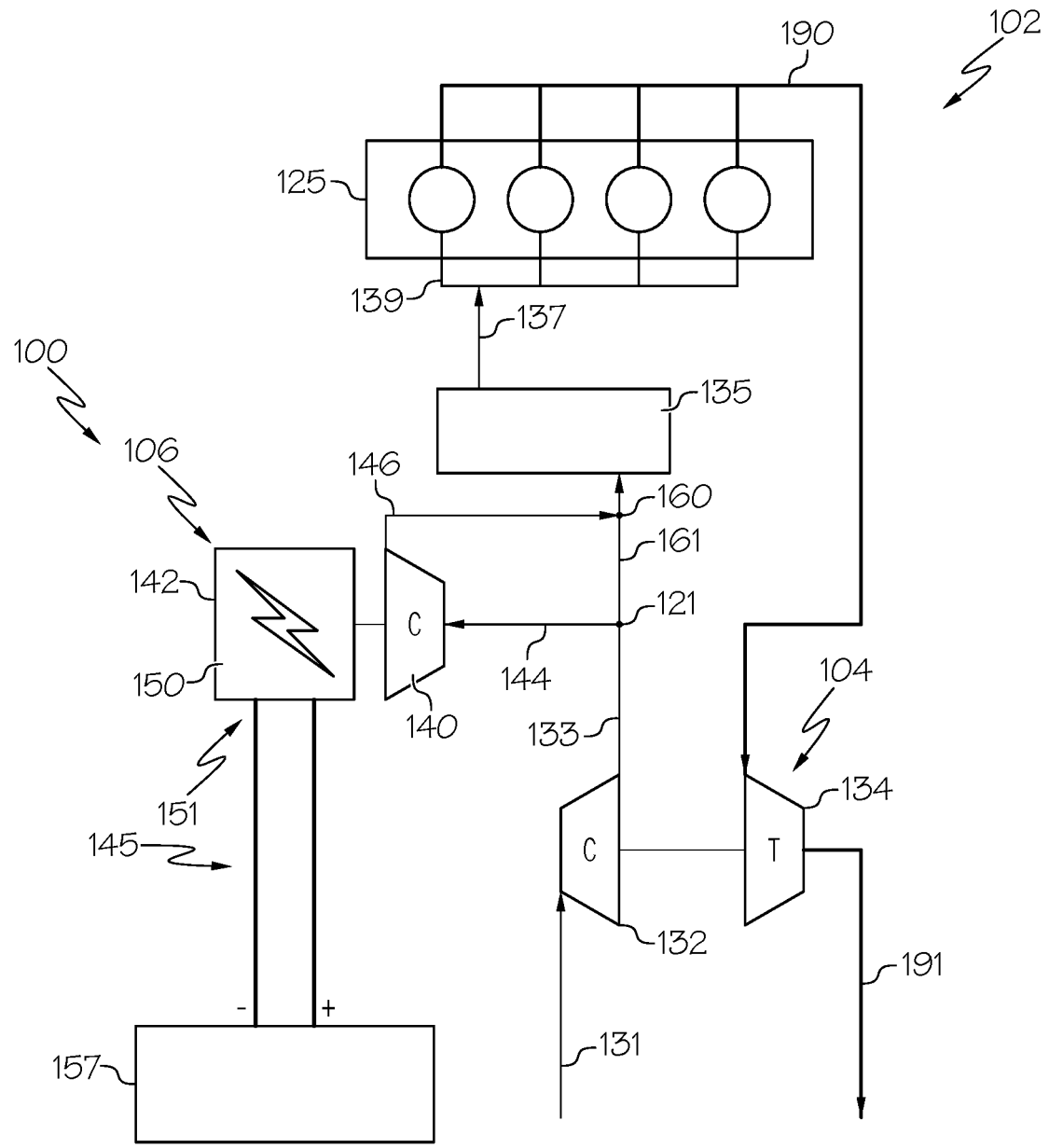
FIG. 1 is a schematic illustration of an engine system with a turbomachine system that includes an electrical connector arrangement according to example embodiments of the present disclosure.

FIG. 1 is a schematic view of an example turbomachine system 100 according to example embodiments. The turbomachine system 100 may be incorporated within an engine system 102, for example an engine system of a vehicle. The engine system 102 may include an internal combustion engine 125 that is boosted by the turbomachine system 100 as will be discussed. The turbomachine system 100 may include at least one turbomachine, such as a first turbomachine 104 (e.g., a turbocharger) and a second turbomachine 106 (e.g., a motorized fluid compressor).

Generally, the first turbomachine 104 may be a turbocharger with a compressor stage 132 and a turbine stage 134. An exhaust gas stream 190 from the engine 125 may flow toward the turbine stage 134, and drivingly rotate a turbine wheel therein. An exhaust gas stream 191 may flow from the turbine stage 134 as shown. A compressor wheel of the compressor stage 132 may be coupled to the turbine stage 134 to be driven in rotation thereby. As such, the compressor stage 132 may be configured to compress received input air 131 into a first pressurized airstream 133 that is ejected circumferentially from the compressor stage 132.

The first pressurized airstream 133 may be channeled toward a first branch 121, at which the first pressurized airstream 133 may flow toward either the second turbomachine 106 or an intercooler 135 (i.e., air cooler). The intercooler 135 may comprise a convectively cooled charge air cooler. The intercooler 135 may be configured to dissipate heat from the received air for increasing its density. The resulting cooled and pressurized output air stream 137 may be channeled into an intake manifold 139 of the internal combustion engine 125 of the engine system 102.

The second turbomachine 106 may be a fluid compressor that is disposed downstream of the first turbomachine 104. The second turbomachine 106 may include a compressor section 140 and a motor section 142. The motor section 142 may include an electric motor 150 that is operable to drivingly rotate a compressor wheel of the compressor section 140. Accordingly, the compressor section 140 may compress an intake airstream 144 from the first branch 121, and the compressor section 140 may output a compressed airstream 146. The compressed airstream 146 may flow toward a second branch 160 joined to a flow passage 161 extending from the first branch 121. From the second branch 160, the compressed airstream 146 and/or flow of the pressurized airstream 133 may be directed to the intercooler 135 and further downstream to the manifold 139 of the engine 125.

As shown in FIG. 1 and as will be discussed in detail below, the second turbomachine 106 may include an electrical connector arrangement 151. The electrical connector arrangement 151 may include features for conveniently and effectively attaching the motor 150 to a power source 157 via wires 145 or other electrical lines. The power source 157 may be a battery. In some embodiments, the power source 157 may include two terminals of opposite polarity and there may be two wires 145 for establishing a circuit with the motor 150. The electrical connector arrangement 151 may provide robust mechanical support while ensuring electrical connection for an extended operating lifetime and in a wide variety of operating conditions. As will be discussed, the electrical connector arrangement 151 may be moisture-resistant and may limit intrusion of moisture into the turbomachine 106. Accordingly, the structural and electrical connections provided by the electrical connector arrangement 151 may be highly robust. Also, connecting and disconnecting electrical lines via the electrical connector arrangement 151 may be convenient. Connecting the motor 150 and power source 157 may be completed accurately, in a repeatable manufacturing system, and may be accomplished conveniently due to features of the electrical connector arrangement 151. The electrical connector arrangement 151 itself may be manufactured and provided with high manufacturing efficiency. These and other features and advantages will be explored below.

It will be appreciated that the turbomachine system 100 may be configured differently from the configurations illustrated in FIG. 1 without departing from the scope of the present disclosure. The turbomachine system 100 may include any number of turbomachines and/or the turbomachines 104, 106 may be configured differently without departing from the scope of the present disclosure. The electrical connector arrangement 151 may also be configured for another electrical device (i.e., other than a motor) and/or incorporated in another device (i.e., other than a turbomachine) without departing from the scope of the present disclosure.

In other words, it will be appreciated that the turbomachine system 100 may include any number of turbomachines and may be arranged in a number of fluid flow arrangements that fall within the scope of the present disclosure. The electrical connector arrangement 151 may be configured for and incorporated in another turbomachine (e.g., an e-assist turbocharger, etc.) in additional embodiments of the present disclosure. Additionally, the electrical connector arrangement 151 may be included for another electrical machine. For example, the electrical connector arrangement 151 may be configured for a generator within the turbomachine 106, or the arrangement 151 may be configured for a combination of both motor and generator in some embodiments. The e-machine within the turbomachine 106 may be configured to switch functionality between motor and generator modes in some embodiments. Furthermore, the turbomachine of the present disclosure may be incorporated into a number of systems other than an engine system without departing from the scope of the present disclosure. For example, the turbomachine 106 and the electrical connector arrangement 151 of the present disclosure may be incorporated within a fuel cell system for compressing air that is fed to a fuel cell stack, or the turbomachine may be incorporated within another system without departing from the scope of the present disclosure.

Figure 2:
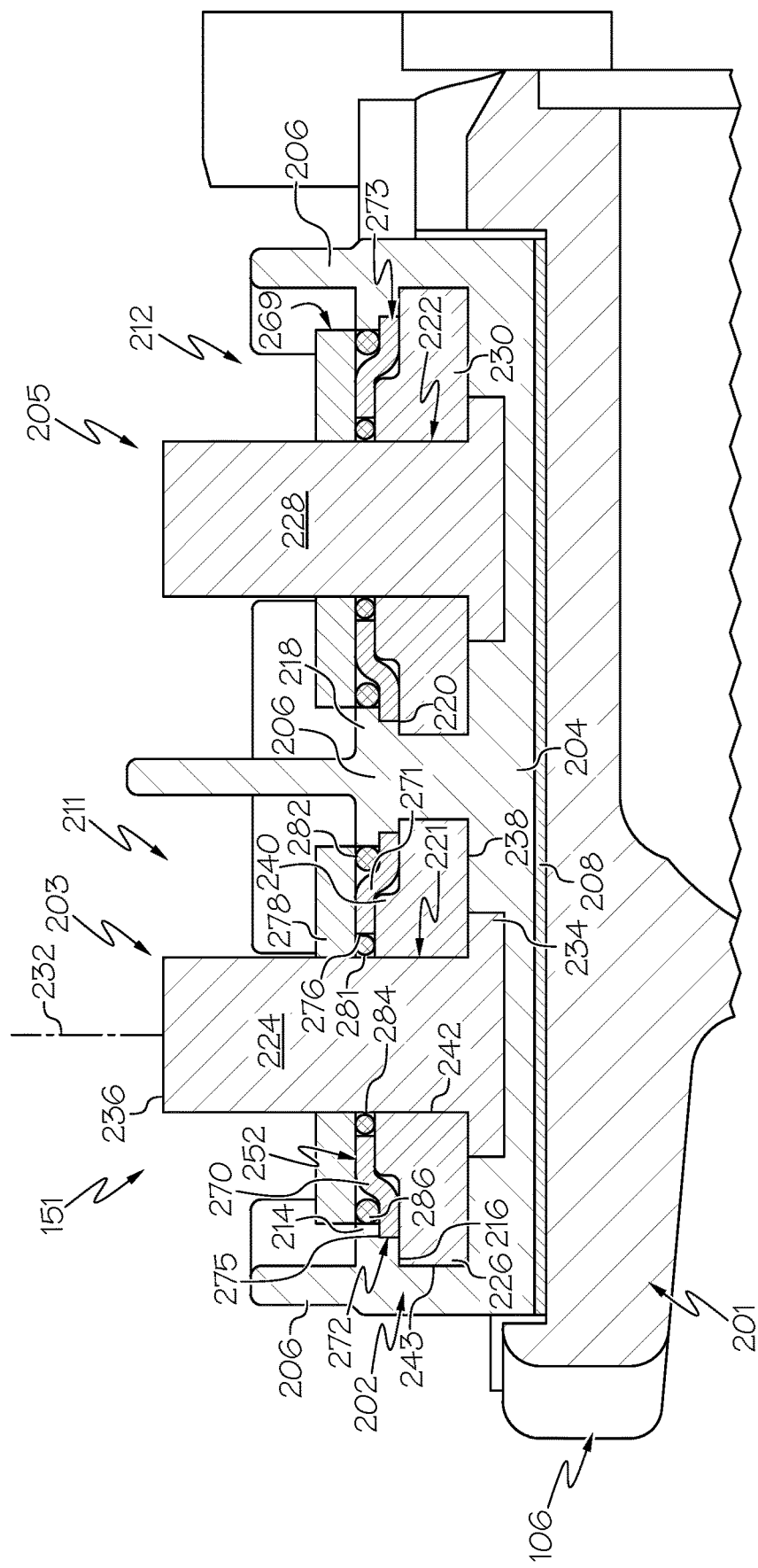
FIG. 2 is a cross sectional view of an electrical connector arrangement according to example embodiments of the present disclosure.

Referring now to FIG. 2, the turbomachine 106 and the electrical connector arrangement 151 between the power source 157 and the electric motor 150 will be discussed in greater detail according to example embodiments. The turbomachine 106 may include an outer housing 201. The outer housing 201 may be made out of aluminum or other metal in some embodiments. The outer housing 201 may house the electric motor 150 therein. The electrical connector arrangement 151 may be supported on the outer housing 201.

The electrical connector arrangement 151 may include a support structure 202 (i.e., a chassis, support plate, etc.). The support structure 202 may comprise a flat plate or plate-like member. The support structure 202 may comprise polymeric material. The support structure 202 may include a base plate 204 that is relatively flat. The support structure 202 may also include a plurality of walls 206 that extend away from the base plate 204. The underside of the base plate 204 may be layered over and attached to the outer housing 201. In some embodiments, the base plate 204 may be adhesively attached to the outer housing 201 via an adhesive layer 208. The walls 206 may define a first opening 211 and a second opening 212 of the support structure 202. The support structure 202 may also include a first lip 214 that projects inward from the walls 206 to define a first undercut area 216 of the first opening 211. The support structure 202 may also include a second lip 218 that defines a second undercut area 220 of the second opening 212. The first lip 214 and first undercut area 216 may have an inverted, stepped profile as shown in FIG. 2, and the second lip 218 and second undercut area 220 may be similarly stepped.

The electrical connector arrangement 151 may also include a first terminal 203 with a first bolt structure 221 and a second terminal 205 with a second bolt structure 222. The first bolt structure 221 may include a first terminal post 224 and a first base member 226. The second bolt structure 222 may include a second terminal post 228 and a second base member 230. The first terminal 203 and the second terminal 205 may be supported by and attached to the support structure 202. The first bolt structure 221 and the second bolt structure 222 may be made of a highly electrically-conductive metal. The first and second terminals 203, 205 may be configured as having opposite polarities. In other words, one of the terminals 203, 205 may be a positive terminal, and the other may be a negative terminal.

The first terminal post 224 may be cylindrical and may extend along a straight, longitudinal terminal axis 232. The first terminal post 224 may include a retained terminal end 234 and a projecting end 236, which are separated along the axis 232. The first base member 226 may be cam-shaped, die-shaped, or otherwise shaped. The first base member 226 may include a first surface 238 and a second surface 240, which face generally in opposite directions along the axis 232. The first base member 226 may include an aperture 242 (e.g., a round hole) that is centered on the axis 232. The first base member 226 also includes an outer peripheral edge 243.

Figure 4:
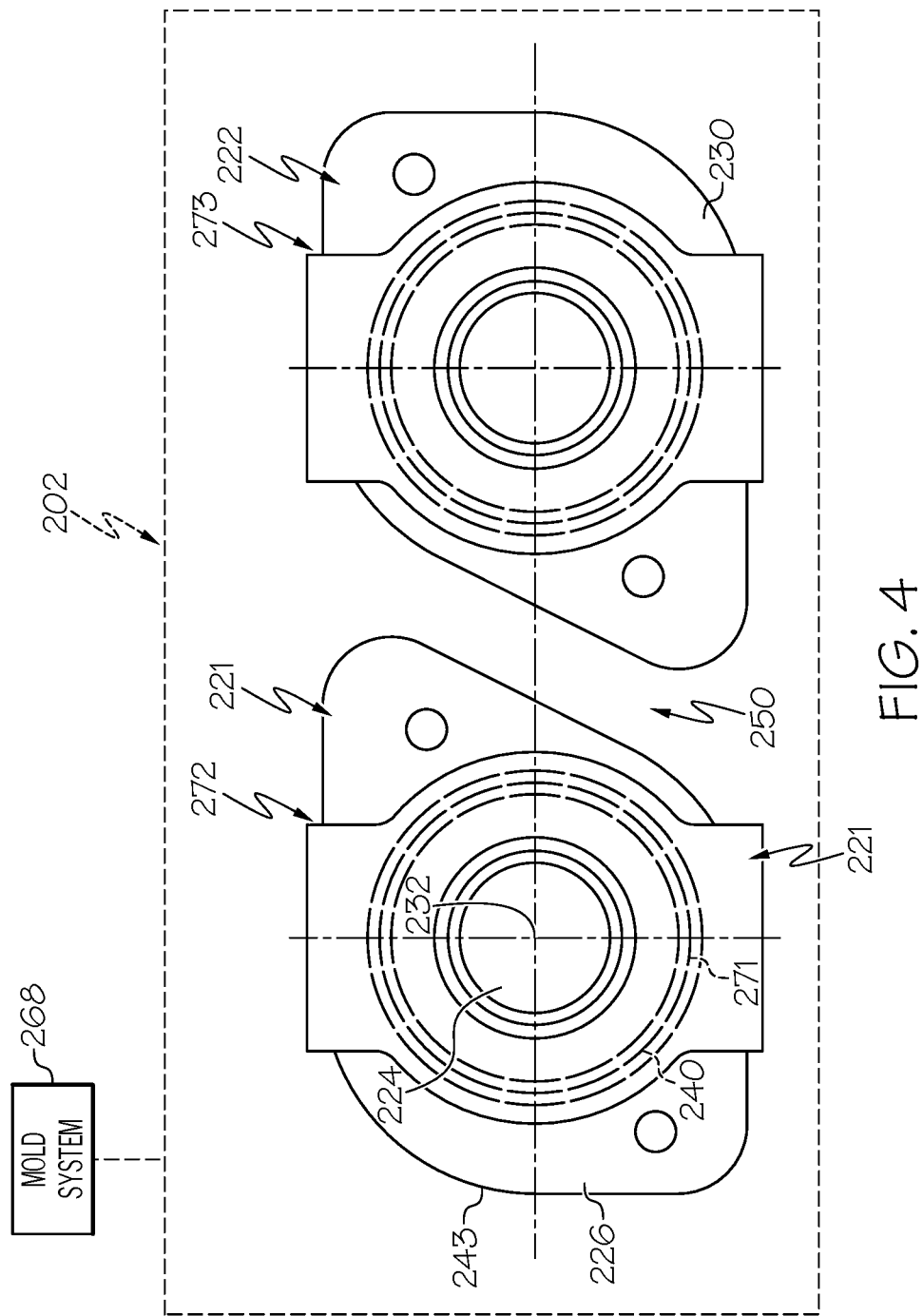
FIG. 4 is a plan view of bolt structures of the electrical connector arrangement of FIGS. 2 and 3 according to further example embodiments.

As shown in FIG. 2, the aperture 242 may receive and may engage the terminal end 234 of the terminal post 224. The projecting end 236 may project along the axis 232 away from the base member 226. Also, as shown in FIG. 2, the outer peripheral edge 243 of the base member 226 may be received within the first undercut area 216 and retained underneath the first lip 214 of the support structure 202. FIG. 4 shows the support structure 202 schematically and in phantom, but as represented, the outer peripheral edge 243 may be encompassed by the support structure 202. As shown in FIG. 2, the first bolt structure 221 may be attached to the support structure 202 with the terminal post 224 projecting away from the base plate 204 and the outer housing 201 of the turbomachine 106. Also, the first lip 214 may be spaced apart radially from the outer diameter surface of the first terminal post 224.

As shown in FIG. 4, the outer peripheral edge 243 may extend about the axis 232. The outer peripheral edge 243 may include four straight sides that meet at rounded corners. The outer peripheral edge 243 may resemble a quadrilateral, with at least two parallel sides. As shown, the outer peripheral edge 243 may be asymmetrical with respect to the axis 232 such that there is no line of symmetry that is normal to the axis 232 for the outer peripheral edge 243. The outer peripheral edge 243 may be generally kite-shaped or diamond-shaped in some embodiments.

Figure 3:
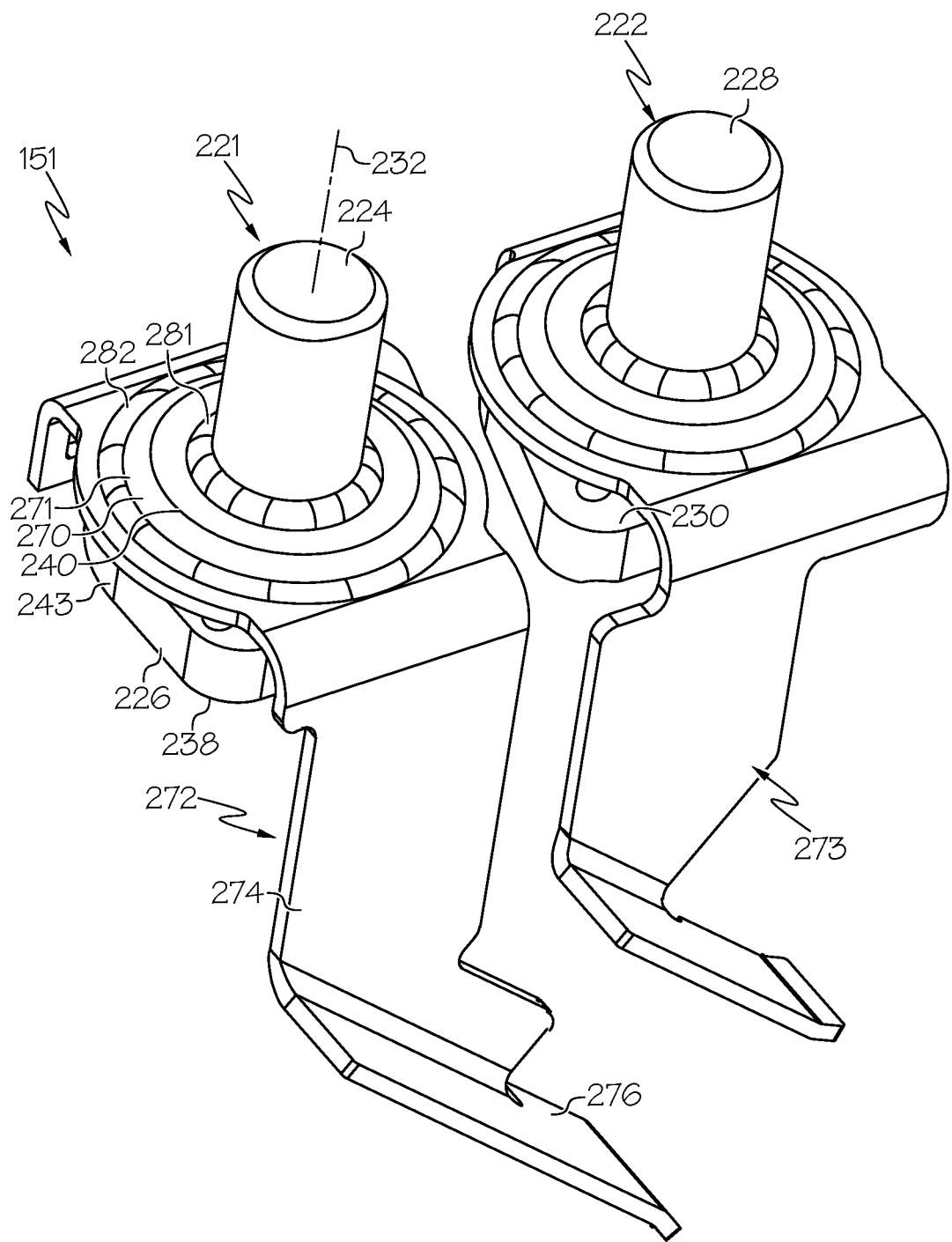
FIG. 3 is a perspective view of features of the electrical connector arrangement of FIG. 2 according to example embodiments.

The electrical connector arrangement 151 may further include a bus bar 272 (FIG. 3), which is connected to the first terminal 203. The bus bar 272 may comprise a plate of consistent thickness and that comprises an electrically conductive material (e.g., copper). The bus bar 272 may be bent, folded, shaped, etc. to include a number of features, including an end 270. The end 270 may be coupled to the first bolt structure 221 as will be discussed in detail below. Furthermore, as shown in FIG. 3, the bus bar 272 may include an elongate end 274 that extends away from the first terminal post 224 and the support structure 202. The elongate end 274 may bend away from the end 270 and may extend through the outer housing 201 of the turbomachine 106 to electrically connect to the motor 150 (FIG. 1) therein.

Figure 5:
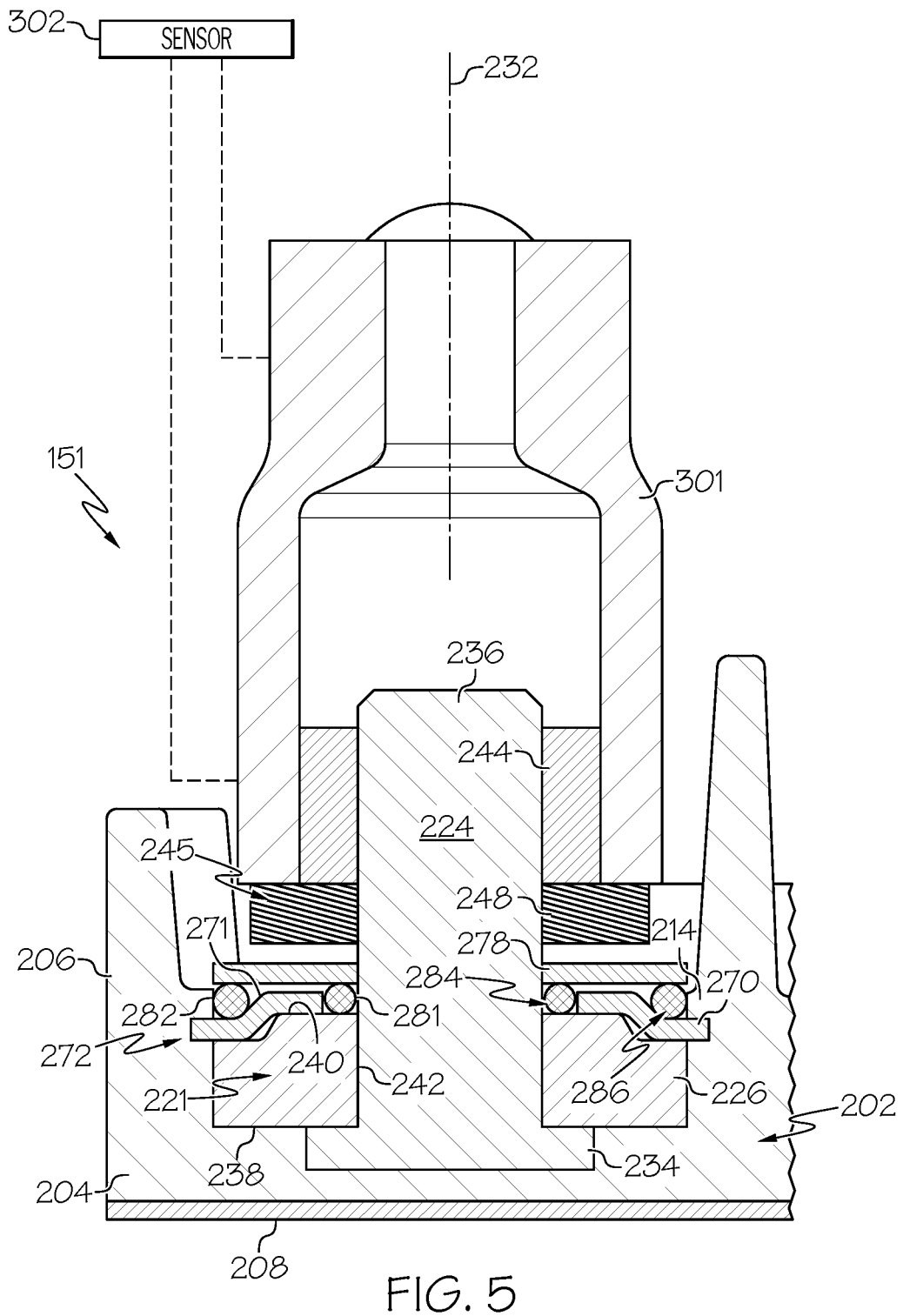
FIG. 5 is a cross sectional view of the electrical connector arrangement shown with a fastener being fastened to a terminal post of the electrical connector arrangement according to example embodiments.
Figure 6:
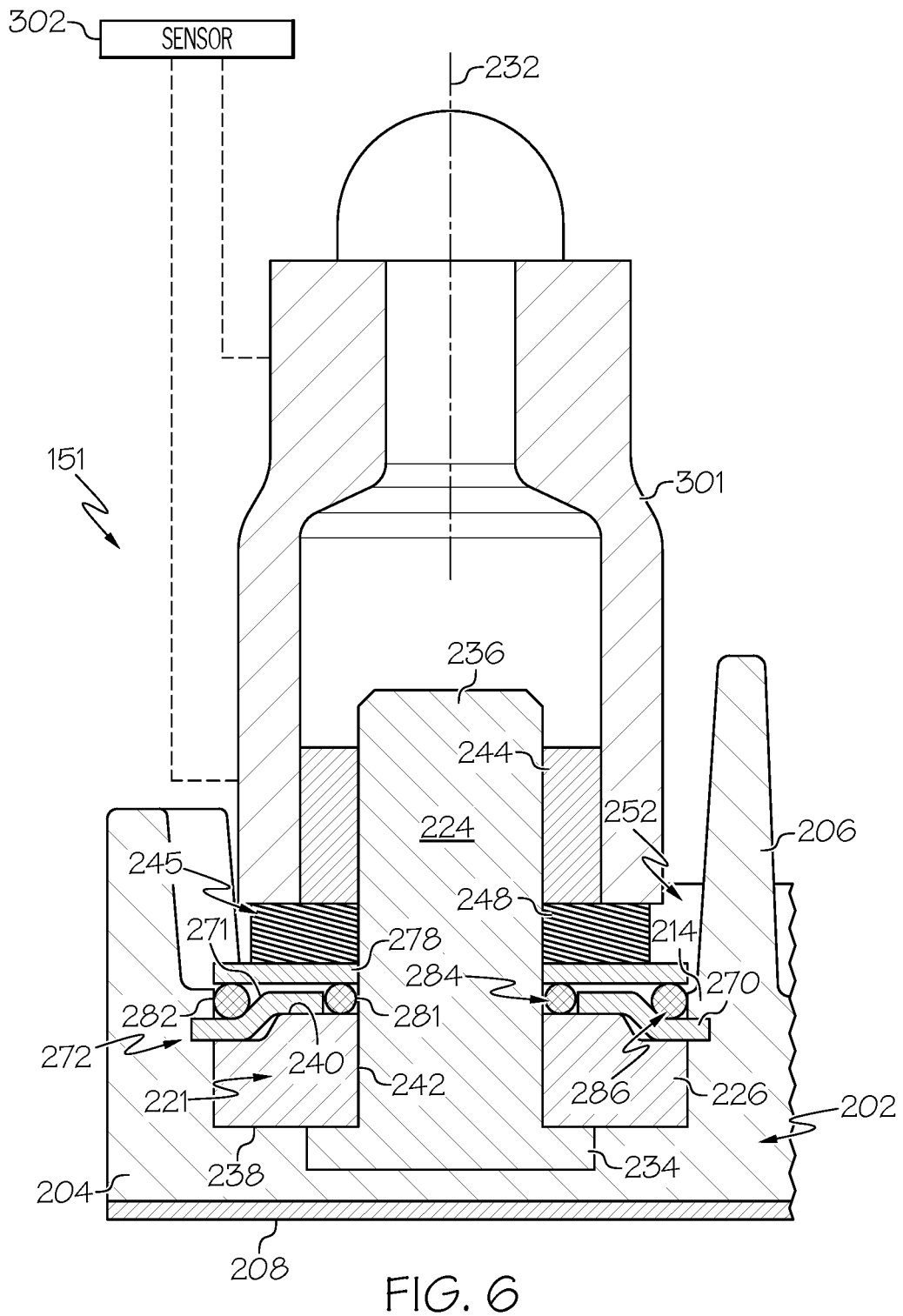
FIG. 6 is a cross sectional view of the electrical connector arrangement of FIG. 5 shown with the fastener fastened to the terminal post.

In some embodiments, the outer diameter surface of the first terminal post 224 may be at least partially threaded along the axis 232. Accordingly, as shown in FIGS. 5 and 6, a threaded fastener 244, such as a nut, may be attached to the first terminal post 224. It will be appreciated, however, that the fastener 244 may be of a different type without departing from the scope of the present disclosure.

The fastener 244 may attach various components to the first terminal post 224. For example, as shown in FIGS. 5 and 6, the fastener 244 may attach a terminal end 248 of the wire 245 to the first terminal post 224. The end 248 may, thus, be structurally and electrically attached to the first terminal post 224, by being compressed between the fastener 244 and the terminal end 234 in some embodiments.

The electrical connector arrangement 151 may further include a connection stack 252 (FIGS. 2 and 6). The connection stack 252 may comprise the number of components that are stacked and compressed along the axis 232, for example, between the fastener 244 and the terminal end 234. The connection stack 252 may include features that ensure robust structural and electrical connection for the terminal end 248 of the wire 245. Furthermore, the connection stack 252 may include features that inhibit water intrusion through the stack 252 and into the turbomachine 106.

The connection stack 252 may include the base member 226 described above. The first surface 238 may face inward toward the support structure 202 and may abut against the terminal end 234 of the post 224. Also, the outer peripheral edge 243 may extend further outward radially than the lip 214 so as to be retained by the support structure 202 in some embodiments. The base member 226 may be considered a compression member that is compressed within the stack 252 as will be discussed.

The connection stack 252 may further include the end 270 of the bus bar 272. The end 270 may include a central opening 276 that is received and retained on the first terminal post 224. As shown in FIG. 2, the end 270 may include an annular step 271. The step 271 (i.e., a first step) may surround the opening 276 correspond in shape and dimension to engage, receive, fit upon, and/or nest with the stepped second surface 240 (i.e., a second step) of the first base member 226. As shown in FIG. 2, an outer radial edge 275 of the end 270 may extend out to be received beneath the lip 214. Accordingly, the end 270 of the bus bar 272 may be retained by the support structure 202 within the undercut area 216.

The connection stack 252 may further include a compression plate 278 (i.e., compression member, washer, press plate, pressure disc, compression ring, cam, etc.). The compression plate 278 may be annular. In some embodiments, the compression plate 278 may comprise a flat washer. The compression plate 278 may be made from an electrically conductive material, such as copper or copper alloy. As shown in FIGS. 5 and 6, the compression plate 278 may be received underneath the terminal end 248 of the wire 246 so as to be compressed between the terminal end 248 and the end 270 of the bus bar 272.

In some configurations, the connection stack 252 may include the terminal end 248 (FIGS. 5 and 6). However, when disconnected from the wire 246, the terminal end 248 may be omitted from the connection stack 252.

Moreover, as shown in FIGS. 2, 3, 5, and 6, the connection stack 252 may include at least one seal member, such as a first seal member 281 and a second seal member 282, for inhibiting moisture intrusion into the connection stack 252. The seal member(s) 281, 282 may facilitate manufacture of the turbomachine 106. The seal member(s) 281, 282 may provide additional advantages as well.

In some embodiments, the first and/or second seal members 281, 282 may be annular (FIG. 3). For example, as shown in the illustrated embodiments, the first and second seal members 281, 282 may be O-rings with circular cross sections when in a neutral, uncompressed state. The first and second seal members 281, 282 may be constructed from and/or comprise a resilient material, such as rubber, polymer, polymerized material, etc. Thus, the first and second seal members 281, 282 may resiliently compress when compressed within the stack 252. The first and second seal members 281, 282 may, in some embodiments, plastically deform when compressed within the stack 252. The first and second seal members 281, 282 may be deformed under compression within the stack 252 to thereby seal the stack 252 and inhibit water intrusion therethrough.

The first seal member 281 may be a compressible and deformable O-ring that is received within an annular gap 284 defined radially between the outer surface of the first terminal post 224 and the inner radial rim of the end 270 of the bus bar 272. The gap 284 may also be defined axially within the stack 252 between the second surface 240 of the base member 226 and the underside of the compression plate 278.

The second seal member 282 may be a compressible and deformable O-ring that is received within an annular gap 286 defined radially between the step 271 and the inner diameter surface of the lip 214 of the support structure 202. The gap 286 may also be defined axially within the stack 252 between the end 270 of the bus bar 272 and the underside of the compression plate 278.

As shown in FIGS. 5 and 6, a socket head 301 or other tool may be used to torque the fastener 244 upon the stack 252. In some embodiments, a load sensor 302 may be employed for detecting an amount of load applied for threading the fastener 244 onto the terminal post 224. This amount may be detected to control the amount of applied torque and/or axial load on the stack 252. In other words, a predetermined load may be applied for installing the fastener 244.

As the fastener 244 is advanced on the first terminal post 224 (e.g., from the position of FIG. 5 to the position of FIG. 6), the terminal end 248 may be compressed against the compression plate 278. The compression plate 278 may compress against the first and second seal members 281, 282. The first seal member 281 may deform and compress against the surfaces defining the gap 284. Accordingly, the first seal member 281 may define a first seal within the stack 252 by deforming and compressing radially against the first terminal post 224 and the inner radial surface of the bus bar 272 and axially between the base member 226 and the compression plate 278. The second seal member 282 may define a second seal in the gap 286 within the stack 252. The second seal member 282 may deform and compress radially against the step 271 and the inner diameter surface of the lip 214 of the support structure 202 and axially between the end 270 of the bus bar 272 and the underside of the compression plate 278.

These seals may seal the stack 252, for example, against water, water droplets, or other moisture. Accordingly, the electrical connector arrangement 151 may protect the turbomachine 106 and make the electrical connection highly robust. Also, it will be appreciated that the arrangement 151 may be installed easily and conveniently for manufacturing advantages.

As shown in FIG. 2, the second terminal 205 may be substantially similar to the first terminal 203. The second bolt structure 222 may be substantially similar to the first bolt structure 221. The second terminal 205 may include a respective connection stack 269, which may be substantially similar to the connection stack 252 of the first terminal 203. The connection stack 269 may include a respective bus bar 273 (FIGS. 2-3). As mentioned, the second terminal 205 may be configured for an opposite electrical polarity from the first terminal 203. Accordingly, the second terminal 205 may be electrically insulated and isolated from the first terminal 203.

The second base member 230 may be similarly shaped to the first base member 226; however, as shown in FIG. 4, the second base member 230 may be inverted with respect thereto. Also, as shown in FIG. 4, the second base member 230 may be spaced apart from the first base member 226 so as to define a straight, diagonal gap 250 therebetween. The second base member 230 may be attached to the support structure 202 underneath the second lip 218 (FIG. 2) so as to be retained within the second undercut area 220. Accordingly, the second terminal post 228 may project outward from the second opening 212. A fastener (similar to the fastener 244) may be used to compress the second connection stack 269 for connecting another wire 145 to the second terminal 205.

During manufacture of the turbomachine 106, the support structure 202 may be molded (e.g., injection molded). As represented in FIG. 4, the support structure 202 may be molded using a molding system 268. For example, the support structure 202 may be molded and formed around the first bolt structure 221, the second bolt structure 222, and the bus bars 272, 273 in an insert-molding (overmolding) process. It will be appreciated that this process may increase manufacturing efficiency. Also, it will be appreciated that the asymmetric shape of the outer peripheral edge 243 may enhance attachment of the bolt structures 221, 222 to the support structure 202.

Next, as shown in FIG. 3, the first and second seal members 281, 282 may be positioned on the first and second bolt structures 221, 222 (support structure 221, 222 hidden in FIG. 3 for clarity). The first and second seal members 281, 282 may be disposed at a common axial position with respect to the axis 232, and the gaps 284, 286 may both be exposed for conveniently placing the seal members 281, 282 therein. Then, the compression plate 278 may be placed atop the seal members 281, 282 as shown in FIG. 2. Subsequently, the fastener 244 may be attached to the terminal post 224 as discussed above. The wire 145 may be attached to the second terminal 205 similarly. The second terminal 205 may be assembled similarly.

Figure 7:
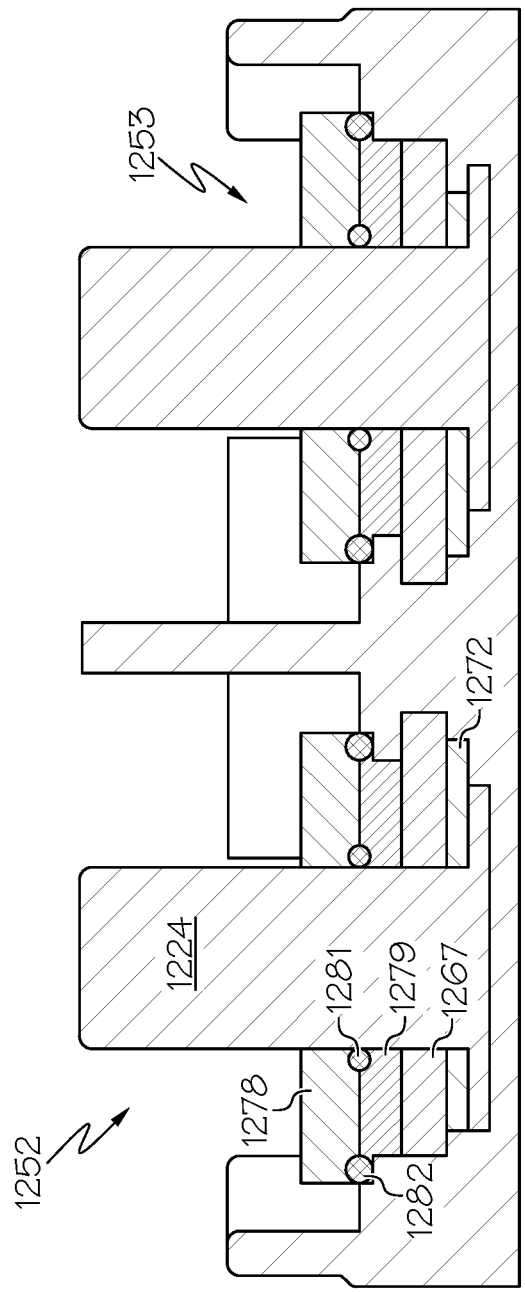
FIG. 7 is a cross sectional view of the electrical connector arrangement according to additional example embodiments of the present disclosure.

Referring now to FIG. 7, additional embodiments of the electrical connector arrangement 1151 are shown according to example embodiments. The electrical connector arrangement 1151 may be substantially similar to the electrical connector arrangement 1151 of FIG. 2 except as noted. Components that correspond to the embodiments of FIG. 2 are indicated with corresponding reference numbers increased by 1000.

On the first terminal post 1224, the connection stack 1252 may include the bus bar 1272, a cam washer 1267, and a pair of overlapping compression plates 1278, 1279. The compression plates may comprise flat washers in some embodiments. The first and second seal members 1281, 1282 may be disposed and compressed between the compression plates 1278, 1279 as represented in FIG. 7. Like the embodiments discussed, above, the seal members 1281, 1282 may seal the stack 1252 and limit moisture intrusion through the inner diameter area of the stack 1252 and through the outer diameter area of the stack 1252. The second stack 1253 may be substantially similar.

Accordingly, the electrical connector arrangements of the present disclosure provide improved connection and robust support. The seal members provide a high level of moisture resistance. The connector arrangements may also provide a number of manufacturing advantages.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. An electrical connector arrangement for a turbomachine comprising:
a support structure;
a terminal with a terminal post projecting from the support structure along an axis;
a connection stack that is supported by the terminal and arranged along the axis of the terminal post, the connection stack including a compression member with a first step, the connection stack including a bus bar with a second step, the first step engaging the second step, the bus bar being electrically connected to the terminal post and extending from the terminal post and the support structure; and
the connection stack including a first deformable seal member and a second deformable seal member, the compression member deforming at least one of the first deformable seal member and the second deformable seal member, the first deformable seal member being deformed against the terminal post to define an inner radial seal within the connection stack, the second deformable seal member being deformed against the support structure to define an outer radial seal within the connection stack.

2. The electrical connector arrangement of claim 1, wherein at least one of the first deformable seal member and the second deformable seal member is annular.

3. The electrical connector arrangement of claim 1, further comprising a fastener that is threadably fastened to the terminal post to compress the connection stack.

4. The electrical connector arrangement of claim 1, wherein the terminal further comprises a base member with an outer peripheral edge that is asymmetric with respect to the axis.

5. The electrical connector arrangement of claim 1, further comprising a base member that connects the terminal post to the support structure; and
wherein the bus bar includes a retained bus end that is electrically connected to the terminal post and that is retained by the support structure, and wherein the bus bar includes an elongate end that extends from the retained bus end.

6. The electrical connector arrangement of claim 5, wherein the support structure includes an opening, the terminal post projecting out from the opening, the opening including a lip that is spaced radially apart from the terminal post with respect to the axis, the retained bus end of the bus bar including an outer edge that is received within the opening underneath the lip to be retained by the support structure.

7. The electrical connector arrangement of claim 1, wherein the first deformable seal member is received radially between the terminal post and an inner radial rim of the bus bar, and wherein the second deformable seal member is received radially between the bus bar and the support structure.

8. The electrical connector arrangement of claim 7, wherein the first deformable seal member and the second deformable seal member are disposed generally at a common axial position with respect to the axis.

9. A method of manufacturing an electrical connector arrangement for a turbomachine comprising:
providing a support structure and a terminal with a terminal post projecting from the support structure along an axis;
supporting a connection stack on the terminal and along the axis of the terminal post, the connection stack including a compression member with a first step, the compression stack including a bus bar with a second step;

engaging the first step and the second step;

electrically connecting the bus bar to the terminal post with the bus bar extending from the terminal post and the support structure; and deforming a first deformable seal member and a second deformable seal member of the connection stack, including compressing the compression member against at least one of the first deformable seal member and the second deformable seal member, deforming the first deformable seal member against the terminal post to define an inner radial seal within the connection stack, and deforming the second deformable seal member against the support structure to define an outer radial seal within the connection stack.

10. The method of claim 9, further comprising advancing a fastener on the terminal post to deform the first deformable seal member and the second deformable seal member.

11. The method of claim 9, wherein at least one of the first deformable seal member and the second deformable seal member is annular.

12. The method of claim 9, further comprising connecting the terminal post to the support structure; and further comprising retaining a retained bus end of the bus bar by the support structure and electrically connecting the retained bus end to the terminal post, and wherein the bus bar includes an elongate end that extends from the retained bus end.

13. The method of claim 12, wherein the support structure includes an opening, the terminal post projecting out from the opening, the opening including a lip that is spaced radially apart from the terminal post with respect to the axis, and wherein retaining the retained bus end of the bus bar includes receiving an outer edge of the retained bus end within the opening underneath the lip to be retained by the support structure.

14. The method of claim 9, wherein the first deformable seal member is received radially between the terminal post and an inner radial rim of the bus bar, and wherein the second deformable seal member is received radially between the bus bar and the support structure.

15. The method of claim 14, wherein the first deformable seal member and the second deformable seal member are disposed generally at a common axial position with respect to the axis.

16. An electrical connector arrangement for a turbomachine comprising:

a support structure that includes an opening;

a terminal with a terminal post projecting out from the opening from the support structure along an axis, the opening including a lip that is spaced radially apart from the terminal post with respect to the axis;

a base member that connects the terminal post to the support structure;

a connection stack that is supported by the terminal and arranged along the axis of the terminal post, the connection stack including a bus bar that is electrically connected to the terminal post and that extends from the terminal post and the support structure, the bus bar including a retained bus end that is electrically connected to the terminal post and that is retained by the support structure, wherein the bus bar includes an elongate end that extends from the retained bus end, the retained bus end of the bus bar including an outer edge that is received within the opening underneath the lip to be retained by the support structure; and the connection stack including a first deformable seal member and a second deformable seal member, the first deformable seal member being deformed against the terminal post to define an inner radial seal within the connection stack, the second deformable seal member being deformed against the support structure to define an outer radial seal within the connection stack.

17. The electrical connector arrangement of claim 16, further comprising a fastener that is threadably fastened to the terminal post to compress the connection stack.

18. The electrical connector arrangement of claim 16, wherein the terminal further comprises a base member with an outer peripheral edge that is asymmetric with respect to the axis.

19. The electrical connector arrangement of claim 16, wherein the first deformable seal member is received radially between the terminal post and an inner radial rim of the bus bar, and wherein the second deformable seal member is received radially between the bus bar and the support structure.

20. The electrical connector arrangement of claim 19, wherein the first deformable seal member and the second deformable seal member are disposed generally at a common axial position with respect to the axis.

* * * * *